United States Patent [19]

Gold

[11] Patent Number: 4,987,699
[45] Date of Patent: Jan. 29, 1991

[54] MOUNTING FOR AN AUTOMOTIVE WINDOW PANEL

[76] Inventor: Peter N. Gold, 465 N. Wood Ave., Rockville Centre, N.Y. 11570

[21] Appl. No.: 398,175

[22] Filed: Aug. 24, 1989

[51] Int. Cl.$^5$ .............................................. B60J 1/00
[52] U.S. Cl. ..................................... 49/375; 156/107; 156/108; 156/109; 156/293; 52/400; 52/208; 52/823
[58] Field of Search ............... 491/374, 375, 376, 377, 491/378; 52/127.4, 208, 823, 400, 790; 156/91, 92, 252, 253, 293, 109, 107, 108

[56] References Cited

U.S. PATENT DOCUMENTS

| | | | |
|---|---|---|---|
| 2,191,500 | 2/1940 | Rosling | 52/208 X |
| 3,930,339 | 1/1976 | Jander | 49/374 |
| 4,118,266 | 10/1978 | Kerr | 156/293 |
| 4,120,120 | 10/1978 | Becker | 49/351 |
| 4,294,057 | 11/1981 | Hagemann | 49/375 |
| 4,330,498 | 5/1982 | Kleykamp | 156/293 X |
| 4,405,175 | 9/1983 | Hoffmann | 296/201 |
| 4,669,241 | 6/1987 | Kelly | 156/109 X |
| 4,762,904 | 8/1988 | Nakama | 52/823 X |
| 4,776,132 | 10/1988 | Gold | 49/375 |
| 4,811,519 | 3/1989 | Gold | 49/375 |
| 4,841,698 | 6/1989 | Gold | 52/208 |

Primary Examiner—Gary L. Smith
Assistant Examiner—Jerry Redman
Attorney, Agent, or Firm—Collard, Roe & Galgano

[57] ABSTRACT

An improved mounting system for attaching an automotive window panel to a window regulating mechanism for raising and lowering the window panel as a mounting bracket for connecting the window panel to the window regulating mechanism. The mounting bracket has a horizontal base member and a pair of leg members extending upwardly from the base member, thereby forming a U-shaped channel for receiving a bottom edge of the window panel. Each of the upwardly extending leg members has at least one opening therein for receiving a curable adhesive applied between the bottom edge of the window panel and the mounting bracket to adhesively hold the window panel in the generally U-shaped channel. The curable adhesive flows into the at least one opening to form a supplemental mechanical interlock between the mounting bracket and the window panel upon curing.

9 Claims, 2 Drawing Sheets

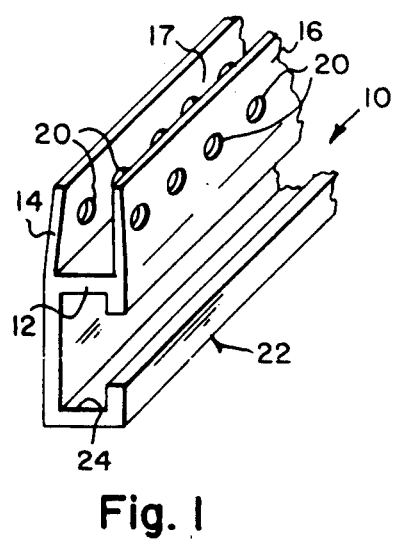
Fig. 1
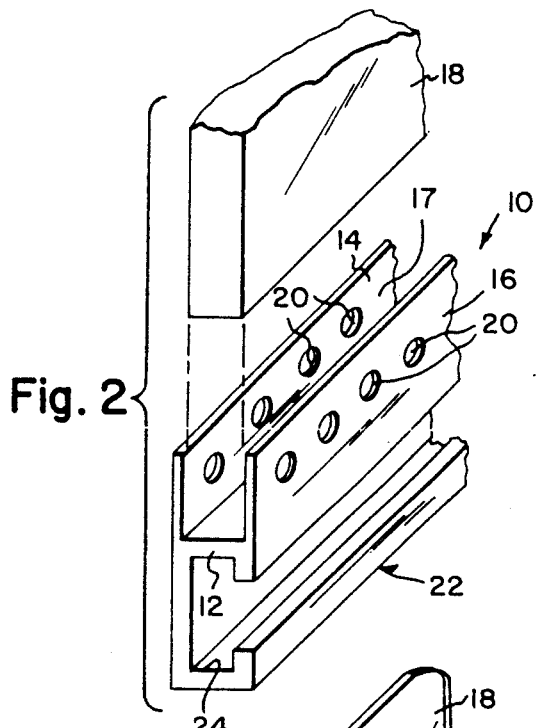
Fig. 2
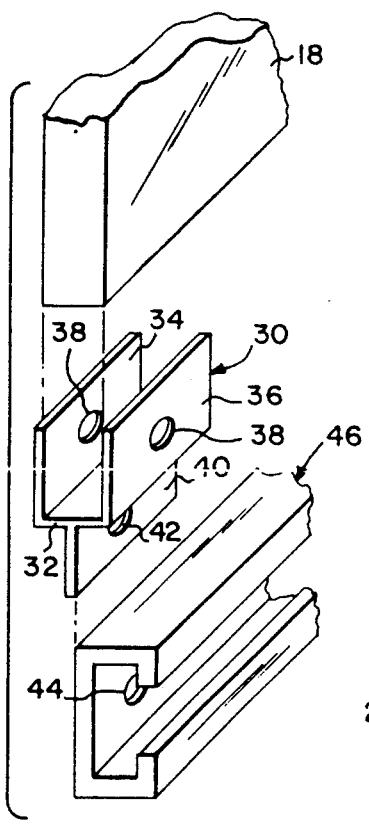
Fig. 4
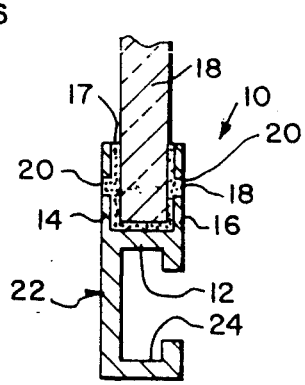
Fig. 5
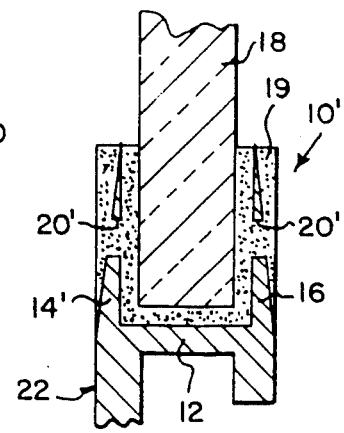
Fig. 3
Fig. 6

MOUNTING FOR AN AUTOMOTIVE WINDOW PANEL

BACKGROUND OF THE INVENTION

1. Field of the Invention

The present invention relates to an improved system for mounting an automotive window panel onto a window regulating mechanism. More particularly, the invention relates to a mounting bracket connecting the window panel to the window regulating mechanism, in which a plurality of holes form a mechanical interlock between the window and the bracket upon the curing of a sealant.

2. Description of the Prior Art

The most common automotive window assemblies of the type interconnected with a window regulating mechanism for raising and lowering the window panel include a mounting bracket for connecting the window panel to the window regulator. Normally, the safety glass of the window panel is held within the mounting bracket either by an elastomeric curable sealant, such as polyurethane, or by the resiliency of the mounting bracket. In either of these two designs, problems have been encountered in maintaining the interconnection between the mounting bracket and the window panel, especially when lowering the window. This is because the frictional force developed within the tracking guideways often causes lamination of the adhesive and the inadvertent disengagement of the window panel from the mounting bracket.

U.S. Pat. No. 4,662,113 describes a typical attachment of an automotive window panel to a support bracket, wherein the lower edge of the safety glass is seated in an L-shaped portion of the bracket. The gasket, of elastomeric or similar material, is molded, in situ, simultaneously to the lower edge of the window and to the bracket. Thus, instead of the gasket being molded at a remote location and being fitted and adhesively secured in place on the lower edge of the glass window this patent teaches the simplified process of having the gasket molding done at assembly. While this procedure has been simplified by having the gasket molded in place, the bond between the mounting bracket and the glass panel is still dependent upon the strength of the adhesive. Again, it has been found that frictional forces developed in the track guideways resisting downward movement of the glass panel causes the panel to disengage from the bracket as a result of being repeatedly lowered to its open position.

U.S. Pat. No. 4,776,132, owned by the applicant of the present invention, discloses a mounting bracket having locking tabs thereon which bend forward and over gripping surfaces formed by notches on the lower edges of the glass panel and thus engage the glass more firmly than the prior art adhesive engagement. This prevents the loosening of the glass window, particularly during its movement to the open position. In addition to the locking tabs, an array of anchor holes are placed in a vertical wall of the mounting bracket. The use of tabs and anchor holes in conjunction with a urethane sealant eliminates the necessity for drilling holes in or notching the glass to mechanically attach the glass panel to the mounting bracket. The disadvantage of this design is that the bottom of the window panel must be notched at an angle, so that a mechanical interlock can be formed with the tabs once they are bent. The design of the present invention eliminates the need for such notches and allows the use of a standard generally U-shaped mounting bracket interconnected to the window regulating mechanism.

SUMMARY OF THE INVENTION

It is an object of the invention to provide a mounting bracket for an automotive window panel which is operatively coupled to a window regulating mechanism and which can be bonded to the bottom of the window panel.

It is another object of the invention to provide a generally U-shaped mounting bracket which includes a plurality of holes in the upwardly extending legs thereof, so that mechanical interlock between the bottom of the window panel and the mounting bracket can be formed with a curable sealant.

It is yet another object of the invention to provide a mounting bracket for mounting to the bottom of an automotive window panel which is simple in design, economical to manufacture, is easy to install and yet provides a strong positive attachment between the window panel and the window regulating mechanism.

Accordingly, these and related objects are achieved by an improved mounting system for attaching an automotive window panel to a window regulating mechanism, in which a window panel mounting bracket is utilized to connect the window panel to the window regulating mechanism. The mounting bracket has a horizontal base member and a pair of upwardly extending leg members forming a generally U-shaped channel for receiving the bottom edge of the window panel. Each of the upwardly extending leg members has at least one opening therein for receiving a curable adhesive applied between the bottom edge of the window panel and the mounting bracket to adhesively hold the window panel in the generally U-shaped channel. The curable adhesive flows into the openings in the upwardly extending leg members to form a supplemental mechanical interlock with the mounting bracket upon curing.

The initial assembly of the system is simplified if the upwardly extending leg members are sprung inwardly towards one another, prior to insertion of the window panel into the generally U-shaped channel of the mounting bracket. The leg members are then deflected apart upon the insertion of the window and are held in position on the bottom of the window panel by the spring force of the leg members until the adhesive cures. The window panel mounting bracket may extend either the entire length of the bottom of the window panel or may be composed of two or more individual brackets spaced along the bottom thereof. If a single continuous bracket is used, each leg includes a multiplicity of openings for receiving the curable adhesive.

These are other objects and advantages of the present invention will become apparent from the following description of the accompanying drawing, which disclose several embodiments of the invention. It is to be understood that the drawings are to be used for purposes of illustration only, and not as a definition of the invention.

BRIEF DESCRIPTION OF THE DRAWING

In the drawing, wherein similar reference numerals denote similar elements throughout the several views:

FIG. 1 is a fragmentarily-illustrated top, side and end isometric view of a window panel mounting bracket embodying the present invention;

FIG. 2 is a view comparable to that of FIG. 1, showing a window panel being inserted into the U-shaped channel thereof;

FIG. 3 is a cross-sectional view showing the window panel installed within the bracket of FIG. 2, after curing of the adhesive;

FIG. 4 is an exploded, fragmentarily-illustrated top, side and end isometric view similar to FIG. 2, but showing an alternate embodiment of the mounting bracket;

FIG. 5 is a top, end and side isometric view showing two mounting brackets of the type shown in FIG. 4 secured to a window panel;

FIG. 6 is a cross-sectional view comparable to that of FIG. 2, but showing an alternate embodiment of the bracket;

DETAILED DESCRIPTION OF THE PREFERRED EMBODIMENTS

Figure 7:
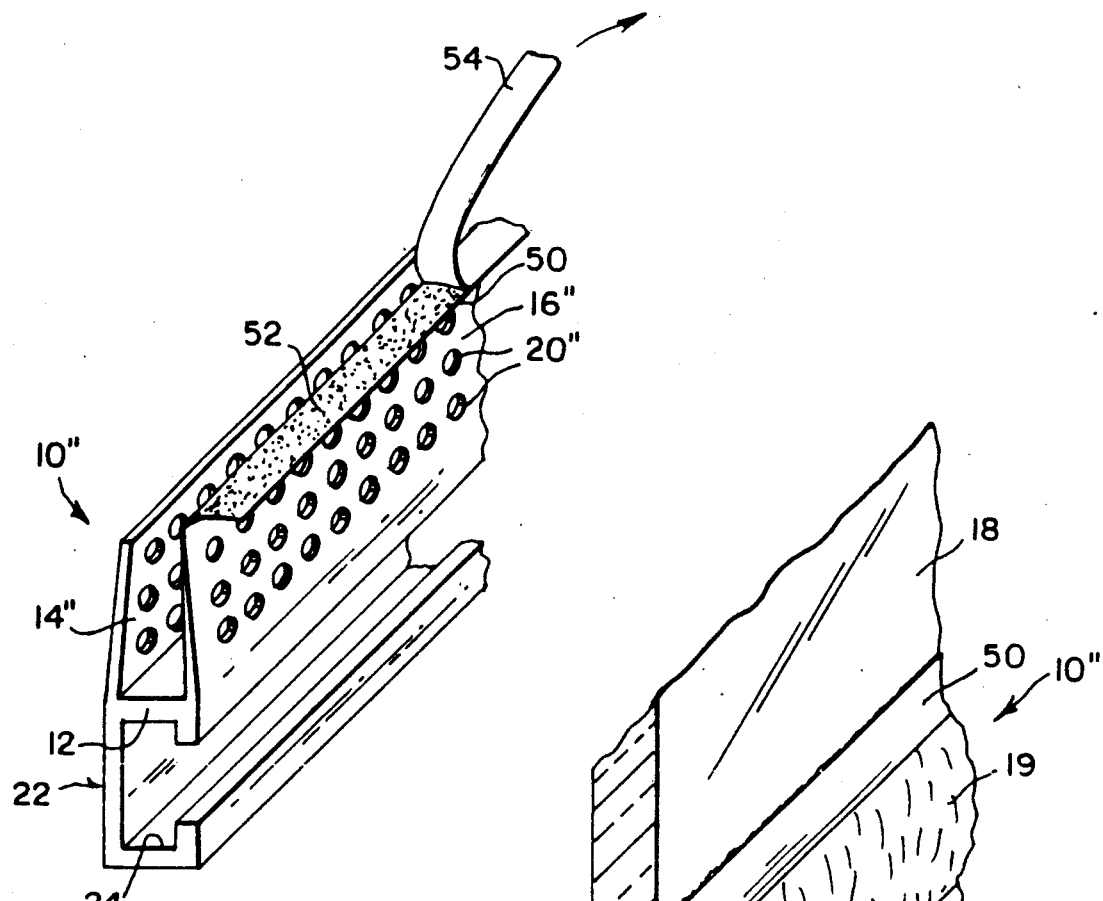
FIG. 7 is a fragmentarily-illustrated top, side and end isometric view of a further embodiment of a window panel mounting bracket embodying the present invention, prior to installation of the window panel.

Referring now, in detail, to the drawings and, in particular, FIG. 1 thereof, therein illustrated is a novel, automotive window panel mounting system which includes a window panel mounting bracket, generally designated by reference numeral 10 which has a generally horizontally-disposed base member 12 from the ends of which upwardly extend a pair of leg members 14, 16 which cooperatively define a U-shaped channel therebetween for the receipt of the lower edge of a window panel 18 (see FIG. 2 and FIG. 3). Preferably, legs 14, 16 are resilient and are sprung inwardly towards one another to provide for a frictional engagement with the window panel edge when so inserted. Each of the legs 14 and 16 also have a row of spaced-apart holes 20 extending therethrough for receiving a curable adhesive, as discussed in detail hereinafter. The horizontal base member 12 is integrally formed with a depending C-shaped follower track 22 which defines a follower channel 24 which can be coupled to a conventional window regulating mechanism. The window regulating mechanism is usually of the scissor-type construction and has rollers at the end of its arms which operate in the follower track 22 and 24, with movement of the scissor linkage (not shown) serving to raise and lower follower track 22 and, in turn, the window panel 18, as is readily understood by those skilled in the art. As can be seen best in FIG. 3, prior to insertion of the edge of the window panel 18 into the U-shaped channel 17, a curable adhesive 19 is applied to the channel, such that upon insertion of panel 18, it flows around the edge of glass panel 18 and through holes 20. Upon curing of this conventional adhesive (such as polyurethane), a mechanical interlock is formed between the cured adhesive 19 and the bracket 10 to enhance the hold of window panel 18 within the channel 17 thereof.

FIG. 4 discloses an alternate embodiment of the invention where, instead of the elongated channel 17 which extends the entire length of the window panel 18, a discrete, short U-shaped bracket 30 is provided, having a base portion 32 and two upstanding legs 34, 36, each of which has a hole 38 formed therethrough. A center flange 40 depends downwardly from base member 32 which has a bolt hole 42 formed therein. Bolt hole 42 can be aligned with a similar bolt hole 44 in a C-shaped follower track 46 which can also be coupled in a well known manner to a window regulating system. A bolt (FIG. 5) and nut (not shown) is used to secure bracket 30 via bolt hole 42 to follower track 46 via bolt hole 44.

As can be seen best in FIG. 5, two of these window brackets 30 would be employed, secured at opposite ends of the follower track 46 to hold a window pane 18. Here too, an adhesive 19 would be employed which would flow through holes 38 to provide a mechanical interlock to further enhance the securing power of brackets 30 to window panel 18.

FIG. 6 discloses an alternate preferred embodiment for the mounting bracket 10' which is otherwise identical to bracket 10 except that it has upwardly tapered or thinned leg members 14', 16'. This increases the leg members 14', 16' resiliency, while decreasing the weight and cost of the bracket. In addition, any loss in holding power is compensated by spreading any excess adhesive and/or sealant escaping through holes 20' across the outer surface of sidewalls 14', 16' to build-up and reinforce the tapered, thinned sections. At the same time, this enhances the mechanical interlock provided by adhesive 19.

Figure 8:
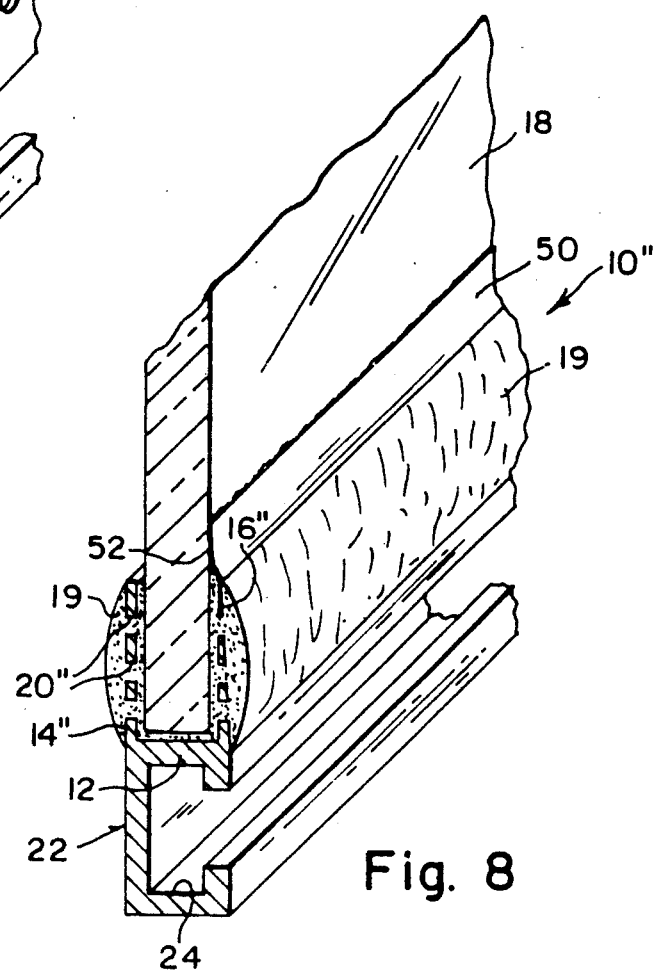
FIG. 8 is a view similar to that of FIG. 7, but showing the bracket following installation of the window panel.

FIGS. 7 and 8 disclose a further preferred embodiment of the mounting bracket 10'', preferably made of extruded aluminum, which is otherwise identical to bracket 10, except for the modifications to leg members 14'', 16''. In particular, leg members 14'', 16'' are each provided with a multiplicity of through holes 20'' set in a row and column format, so as to allow a greater amount of sealant to escape outwardly through leg members 14'' and 16''. In addition, leg member 16' is upwardly tapered and is provided with an extension in the form of a flap 50 adjacent its free end which preferably has a thickness of about 1 mil. The inner surface of flap 50 has a conventional pressure-sensitive adhesive 52 affixed thereto which, in turn, is initially covered by a peel away release strip 54. As can be seen in FIG. 8, following insertion of the glass panel 18 into the channel between leg members 14'', 16'', release strip 54 is removed and flap is pressed against window panel 18 to immediately adhesively bond bracket 10'' to the glass panel 18 prior to curing of the adhesive 19; this is important as the conventional curable adhesives 19 employed normally take many hours to cure. In this embodiment, the excess adhesive and/or sealant escaping through holes 20'', is spread across the outer surface of side walls 14'', 16'' to encapsulate the entire aluminum bracket, adding structural strength thereto, as well as enhancing the mechanical interlock provided by adhesive 19.

While several of the embodiments of the present invention have been illustrated and described, it is obvious that many changes and modifications may be made thereunto, without departing from the spirit and scope of the invention.

What is claimed is:

1. An improved mounting system for attaching an automotive window panel to a window regulating mechanism for raising and lowering the window panel, comprising:

a window panel mounting bracket for connecting the window panel to the window regulating mechanism having a horizontal base member and a pair of leg members having an outer surface and extending upwardly from said base member forming a generally U-shaped channel for receiving a bottom edge of the window panel, each of said upwardly extending leg members having at least one opening therein for receiving a curable adhesive applied between the bottom edge of the window panel and said mounting bracket to adhesively hold the window panel in said generally U-shaped channel, and a sufficient amount of said curable adhesive being applied to thereby form a supplemental mechanical interlock with the mounting bracket upon curing of the adhesive, wherein excess adhesive escaping through said openings is spread across the outer surface of said leg members to build-up and reinforce said leg members and at the same time to enhance the mechanical interlock provided by said adhesive.

2. An improved mounting system, as set forth in claim 1, wherein said upwardly extending leg members are sprung inwardly towards one another prior to the insertion of said window panel into said generally U-shaped channel and are deflected apart upon said insertion.

3. An improved mounting system, as set forth in claim 1, wherein said window panel mounting bracket has a length substantially equal to the length of said bottom edge of the window panel.

4. An improved mounting system, as set forth in claim 3, wherein each upwardly extending leg of same mounting bracket includes a multiplicity of openings for receiving a curable adhesive.

5. An improved mounting system, as set forth in claim 1, wherein said window panel mounting bracket has a mounting flange normally disposed to and coupled to said base member thereof, having at least one bolt hole formed therethrough for securing said mounting bracket to a window regulating mechanism.

6. An improved mounting system, as set forth in claim 1, additionally including a C-shaped channel having an upstanding support member and upper leg and a lower leg secured at opposite ends thereof and wherein said base member is secured to said upper leg of said C-shaped channel.

7. An improved mounting system, as set forth in claim 1, wherein said leg members are tapered.

8. An improved mounting system for attaching an automotive window panel to a window regulating mechanism for raising and lowering the window panel, comprising:

a window panel mounting bracket for connecting the window panel to the window regulating mechanism having a horizontal base member and a pair of leg members extending upwardly from said base member forming a generally U-shaped channel for receiving a bottom edge of the window panel, each of said upwardly extending leg members having at least one opening therein for receiving a curable adhesive applied between the bottom edge of the window panel and said mounting bracket to adhesively hold the window panel in said generally U-shaped channel, and to thereby form a supplemental mechanical interlock with the mounting bracket upon curing of the adhesive, and wherein at least one of said leg members is tapered and has a flap portion adjacent its free end, the inner surface of which has a pressure-sensitive adhesive applied thereto for initially adhesively bonding said leg member to a window panel received within said U-shaped channel.

9. An improved mounting system, as set forth in claim 8, additionally including a release strip releasably secured to the adhesive applied to the inner surface of said flap portion.

* * * * *